United States Patent
Lankhorst et al.

(10) Patent No.: US 7,671,832 B2
(45) Date of Patent: Mar. 2, 2010

(54) MULTI-COLORED LED BACKLIGHT WITH COLOR-COMPENSATED CLUSTERS NEAR EDGE

(75) Inventors: Martijn H. R. Lankhorst, Eindhoven (NL); Wouter Oepts, Eindhoven (NL)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 853 days.

(21) Appl. No.: 11/456,527

(22) Filed: Jul. 10, 2006

(65) Prior Publication Data

US 2008/0007509 A1    Jan. 10, 2008

(51) Int. Cl.
*G09G 3/36*    (2006.01)
(52) U.S. Cl. ........................................ 345/102
(58) Field of Classification Search ................. 345/102; 362/601, 612; 257/89
See application file for complete search history.

(56) References Cited

U.S. PATENT DOCUMENTS

| | | | | |
|---|---|---|---|---|
| 2002/0167016 A1 * | 11/2002 | Hoelen et al. | ................. | 257/89 |
| 2004/0227869 A1 * | 11/2004 | Martynov et al. | ............. | 349/61 |
| 2005/0001537 A1 * | 1/2005 | West et al. | ................... | 313/500 |
| 2006/0205242 A1 * | 9/2006 | Noh et al. | ...................... | 439/57 |

FOREIGN PATENT DOCUMENTS

| | | |
|---|---|---|
| EP | 1462844 A2 | 9/2004 |
| WO | 2006040937 A1 | 4/2006 |

OTHER PUBLICATIONS

International Search Report and Written Opinion, 12 pages.

* cited by examiner

*Primary Examiner*—Richard Hjerpe
*Assistant Examiner*—Carolyn R Edwards

(57) ABSTRACT

Various techniques are described for improving the color uniformity across a backlight for backlighting an LCD. In one embodiment, the backlight uses rows of red, green, and blue LEDs in a mixing chamber. The LEDs are arranged in clusters, such as GRBG or GBRG, each cluster having an associated white point. In order to achieve color uniformity along the left and right edges of the backlight, the LEDs in those edge clusters are specially selected to compensate for the color imbalance in the white point relative to the dimensions of the cluster. For example, a non-compensated cluster of GRBG along the left edge will produce a reddish tint along the left edge since the red peak intensity is to the left of the center of the cluster. To offset this reddish tint along the left side, the cluster's overall white point is blue-cyan shifted. As a result, the left edge of the backlight has the same white point as near the middle of the backlight, where the white point imbalance of a single cluster is offset by the white point imbalance of the surrounding clusters. Similarly, a GBRG cluster along the left edge will have its white point red-yellow shifted.

30 Claims, 5 Drawing Sheets

MULTI-COLORED LED BACKLIGHT WITH COLOR-COMPENSATED CLUSTERS NEAR EDGE

FIELD OF INVENTION

This invention relates to backlights using multi-colored light emitting diodes (LEDs) and, in particular, to techniques for obtaining better color uniformity across the backlight for use in backlighting a liquid crystal display (LCD).

BACKGROUND

Liquid crystal displays (LCDs) are commonly used in laptop computers, desktop monitors, and television applications. One embodiment of the present invention deals with a color, transmissive LCD that requires backlighting, where the backlight contains red, green, and blue LEDs.

FIG. 1 is a cross-sectional view of a color, transmissive LCD 10 that includes a backlight 12. The backlight contains an array of red, green, and blue LEDs 14 whose combined light forms white light.

The backlight 12 ideally provides homogenous light to the back surface of the display. Providing homogenous white light using physically spaced LEDs is very difficult in a shallow backlight box. The backlight box has diffusively reflective bottom and side walls to mix the red, green, and blue light. The inner surfaces may be painted white. Mixing optics 16, such as a diffuser sheet, improves the color mixing. A diffuser sheet may simply be a roughened sheet of plastic. A brightness enhancement sheet may also be used to direct most of the light within a narrow field of view.

Above the mixing optics 16 are conventional LCD layers 18, typically consisting of polarizers, RGB filters, a liquid crystal layer, a thin film transistor array layer, and a ground plane layer. The electric fields created at each pixel location, by selectively energizing the thin film transistors at each pixel location, causes the liquid crystal layer to change the polarization of the white light at each pixel location. The RGB filters only allow the red, green, or blue component of the white light to be emitted at the corresponding RGB pixel locations. LCDs are well known and need not be further described.

As LED technology advances, the light output and efficiency of power LEDs increase, and fewer LEDs are needed to provide the required light output for an LCD. Using fewer LEDs typically reduces the cost of the backlight. Increasing the pitch of the different color LEDs makes it more difficult to provide adequate color uniformity across the LCD screen, especially with a relatively shallow backlight box. In a 40 inch television backlight, each LED may be spaced apart 10-25 mm.

LEDs in a backlight are typically arranged in rows, where a row is formed of repeating clusters of linearly-arranged LEDs (e.g., GRBG GRBG . . . ). In the prior art, each cluster is designed to have the same target white point, which is the resulting combined light from the cluster assuming total color mixing. A white point is typically identified by a correlated color temperature (CCT) in Kelvin. Other parameters for identifying a white point may also be used and are well known. In the 4-LED cluster of GRBG, the red LED is to the left of the center of the cluster, so the light to the left of center has a reddish tint (the center of gravity of the red is to the left of the center of the cluster). Similarly, since the blue LED is to the right of the center, the light to the right of center has a bluish tint (the center of gravity of the blue is to the right of the center of the cluster). However, for clusters arranged in horizontal rows, when a GRBG cluster is surrounded by other GRBG clusters, which occurs near the middle of the backlight, the spatial nonuniformity of the white point of a single cluster is offset by the opposite spatial nonuniformity of the white points of adjacent clusters. Thus, near the middle of the backlight, there is good color uniformity after some color mixing by the cavity and diffusion by the top diffuser.

Applicants have determined that the offsetting of the spatial nonuniformity of a cluster does not occur for the clusters at the left and right edges of the backlight. Accordingly, the left and right edges of the backlight have the worst color uniformity, which is perceptible to the human eye. Prior art FIGS. 3A and 3B, discussed further below, illustrate an example of this color uniformity problem.

Although a thicker backlight box may provide the additional color mixing to ameliorate these edge effects, thick backlights are undesirable.

Therefore, new techniques are needed for improving the color uniformity across a backlight using LEDs.

SUMMARY

Various techniques are described herein for creating an improved backlight for backlighting an LCD. In one embodiment, the backlight uses an array of red, green, and blue LEDs in a mixing chamber. The mixing chamber has reflective walls, a reflective bottom surface, and a light emitting top area for illuminating the LCD layers overlying the mixing chamber.

The LEDs in the backlight are arranged in clusters. In one example, each cluster is formed of four linearly-arranged LEDs in the sequence GRBG or GBRG, and the clusters form a 9 column by 7 row (9×7) array of clusters (252 LEDs) for a 40 inch television screen. Various other sequences of the RGB LEDs in a cluster may also be used, and other sizes of clusters and arrays may also be used.

In one embodiment, two types of clusters are used (e.g., GRBG and GBRG) in the backlight, where each cluster has the same number of RGB LEDs. In one embodiment, all clusters in the same row are the same. The rows alternate between clusters of the first type and clusters of the second type to improve color uniformity. In another embodiment, the clusters in each row alternate, and the clusters in each column alternate to form a checkerboard pattern for better color uniformity.

In order to achieve color uniformity along the left and right edges of the backlight, the LEDs in those edge clusters are specially selected to compensate for the spatial nonuniformity of the white point of the cluster. For example, a non-compensated cluster of GRBG along the left edge will produce a reddish tint along the left edge since the red center of gravity is to the left of the center of the cluster. To offset this reddish tint along the left side, the cluster's overall white point is blue-cyan shifted. As a result, the left edge of the backlight has the same white point as near the middle of the backlight, where the spatial nonuniformity of the white point of a single cluster is offset by the spatial nonuniformity of the white points of the surrounding clusters. Similarly, a GBRG cluster along the left edge will have its white point red-yellow shifted. A GRBG cluster along the right edge will have its white point red-yellow shifted, and a GBRG cluster along the right edge will have its white point blue-cyan shifted.

The color shifting of the white point may be accomplished by selecting the red and blue LEDs in the edge GRBG or GBRG clusters to have fluxes different from the average fluxes of the red and blue LEDs in the middle GRBG or GBRG clusters. In another embodiment, the color shifting is accomplished by selecting LEDs in an edge cluster to have wavelengths that are different (longer or shorter depending on the direction of the color shift) from the average wavelength of corresponding LEDs in the middle clusters.

The four corners of the backlight have the worst color uniformity since there are no offsetting clusters on two sides. These corner clusters may be custom compensated to be even more color shifted than the other edge clusters.

When the LEDs are manufactured, they are tested and binned in accordance with their flux and color. The color shifting of the white points for the edge clusters is achieved by selecting the LEDs from the proper bins. Such selection may be based on empirical testing due to the complexities of color mixing in a particular backlight box and other factors.

This same technique can be applied to any arrangement of clusters in any size backlight to compensate for the white point of a single cluster being spatially unbalanced across the cluster.

DETAILED DESCRIPTION

Embodiments of the present invention provide improved color uniformity all the way to the edges of an LED backlight for display applications. Applications of embodiments of the invention also include general illumination.

Figure 1:
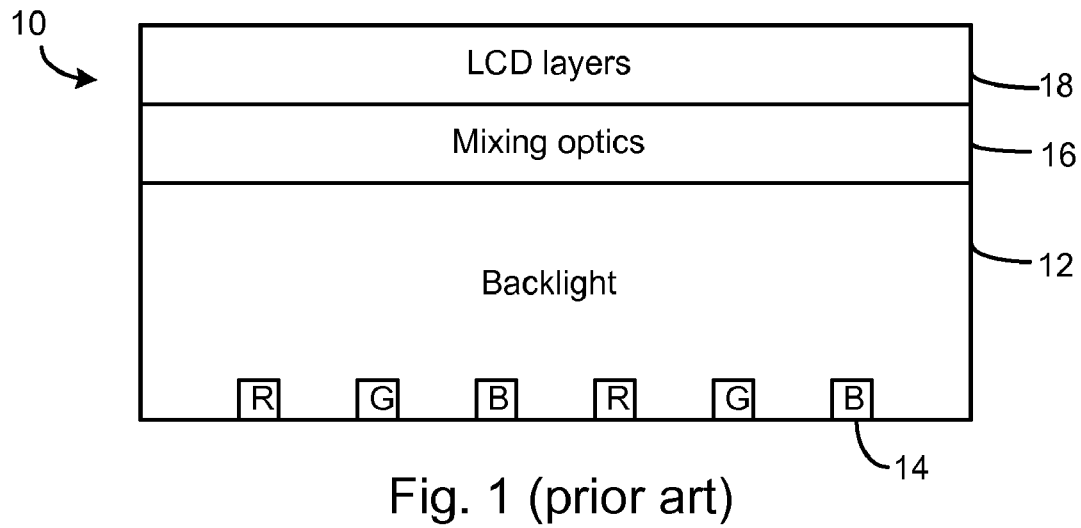
FIG. 1 is a cross-section of a prior art, color, transmissive LCD using a white light backlight.
Figure 2:
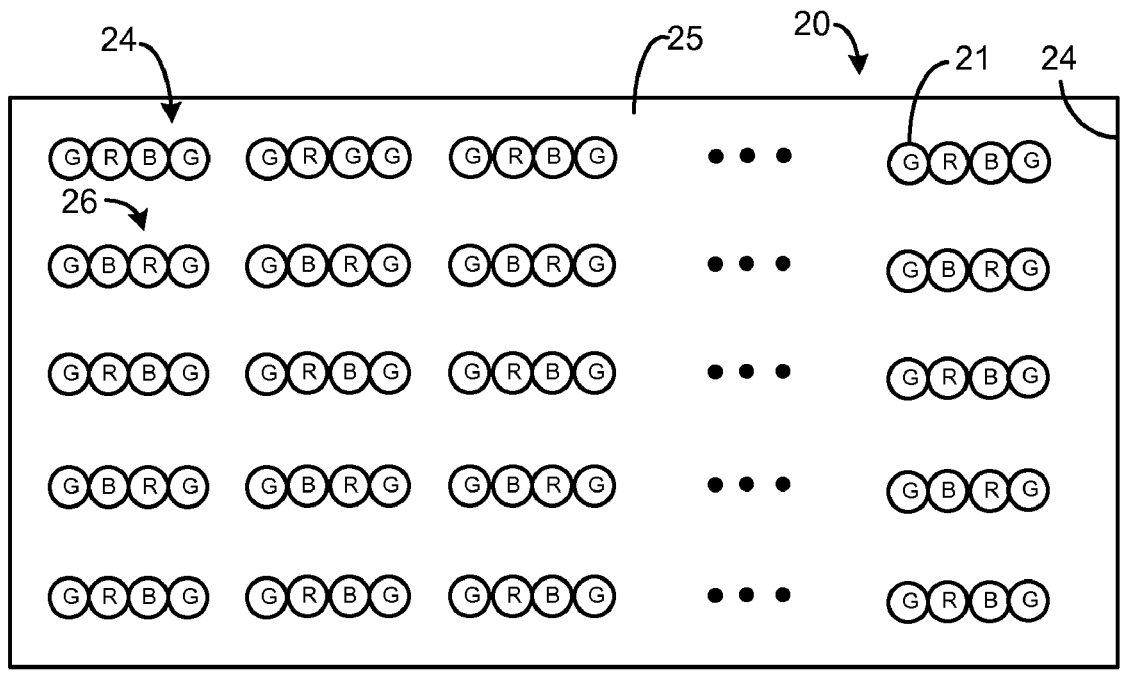
FIG. 2 is a top down view of a backlight for an LCD showing an arrangement of LEDs in accordance with one embodiment of the invention.

FIG. 2 is a top down view of a portion of a backlight 20 containing an array of LEDs 21. The backlight of FIG. 2, and the other backlights described herein, may replace backlight 12 in FIG. 1.

The LEDs in FIG. 2 are arranged in clusters, each having an associated white point. Although there is a space shown between clusters, all LEDs in a single row may be equally spaced, with no additional space between clusters. In one embodiment, the pitch of the LEDs along a row is between 10-25 mm, depending on the light output of the individual LEDs, the size of the backlight, and the requirements of the application. The LEDs may be mounted on printed circuit board strips, with the strips secured to the bottom surface of the backlight cavity.

The backlight may be formed of aluminum sheeting, and its inner walls 24 and base 25 are coated with a diffusively reflective material, such as white paint. Various types of reflective material are commercially available and are well known. In another embodiment, the side walls are covered with a specular film. In one embodiment, the depth of the backlight is 25-40 mm.

A first cluster type 24 is formed of a sequence of four LEDs: GRBG. Other cluster sequences and sizes may also be used with the present invention. The same cluster type 24 (GRBG) is repeated along the first row. In one example, there are nine clusters 24 in a row for a 40 inch TV screen (approximately 1000 mm). In the second row, a different set of clusters 26 are arranged end to end, each cluster 26 having the sequence GBRG, which is the reverse of cluster 24. The rows alternate cluster types. The same numbers of red, green, and blue LEDs are in both clusters 24 and 26, so the overall white point does not change from cluster 24 to cluster 26, except as described below. Since the same color LEDs are not directly aligned in a column, there is better mixing of the colors, in contrast to a layout where the same clusters are used in every row.

In the example of a 40 inch TV screen, there are 9 columns and 7 rows of clusters (252 LEDs total). The number of rows depends on the particular LEDs used, the size of the backlight, and the light output specifications of the backlight. The same cluster type may be positioned in the four corners of the backlight to cause the color at each corner to be identical. This is achieved by making the number of rows an odd number.

Some examples of other cluster types that may be used in the backlight of FIG. 2 include: RBGR and RGBR as cluster types in alternating rows; or BGRB and BRGB as cluster types in alternating rows. Clusters of more than four LEDs may also be used, and clusters with additional colors may be used, such as GRCBRG, where C is a cyan LED.

Although the examples show LEDs arranged in row and columns, other patterns may also be used. Such patterns include zig-zag, wavy, circular, and polygonal patterns. Each cluster may also be in a shape other than a line, such as circular, polygonal, etc.

In another embodiment, the cluster types alternate within a single row and in a single column like a checkerboard pattern for improved color mixing.

Forming a backlight with alternating clusters of LEDs is described in the published U.S. patent application publication 2005/0001537 A1, assigned to the present assignee and incorporated by reference, where a strip of LEDs forming an entire row is reversed for alternating rows. That technique reverses the sequence of LEDs while using the same clusters of LEDs in all rows.

Assuming all LEDs of the same color in the backlight receive the same current, it is important for color uniformity that the same color LEDs in the clusters that make up other than the left and right edges of the backlight emit approximately the same flux and color. In this way each cluster, other than the edge clusters, will have a white point that is about the same as the average target white point across the backlight.

As described above, due to the separation of the LEDs in a cluster, the center of gravity (i.e., peak intensity) of a particular color (e.g., red or blue) is not the same as the center of gravity of another color. For example, the red center of gravity in a GRBG cluster is to the left of the center of the cluster, and the blue center of gravity is to the right of the center of the cluster. For clusters not along the left and right edges of the backlight, this imbalance of color is cancelled out by the opposite imbalance of color of the surrounding clusters.

Figure 3A:
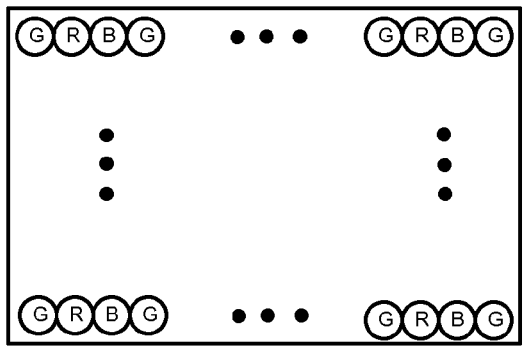
FIG. 3A is a top down view of a prior art backlight for an LCD where all clusters are designed to have the same target white point.
Figure 3B:
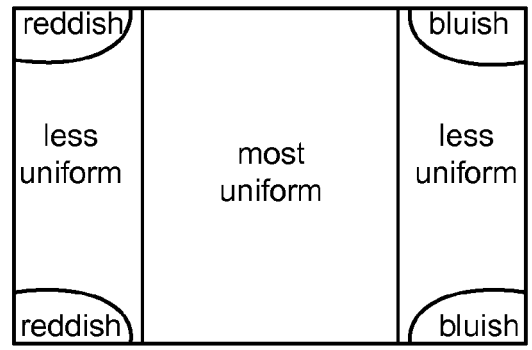
FIG. 3B illustrates the same backlight of FIG. 3A and identifies that the left and right edges exhibit larger white point deviations from the target white point than the middle area, and that the corners have the highest white point deviations.

If the clusters along the edge were not color-compensated, the result would be as shown in FIGS. 3A and 3B. In FIG. 3A, each GRBG cluster has an identical white point. Due to the different centers of gravity of the red and blue colors, the GRBG clusters along the left edge create a reddish tint along the left edge. Similarly, the GRBG clusters along the right edge create a bluish tint along the right edge. Even if the rows of clusters were alternating GRBG and GBRG clusters, the edge clusters will still create alternate red and blue tints along the edge. The reddish tint in the corners is even more pronounced since there are no offsetting clusters on two sides of the corner clusters.

In the present invention, the white points of the edge clusters are color-shifted based on the centers of gravity of the colors in the clusters. This is illustrated in FIGS. 4A and 4B.

Figure 4A:
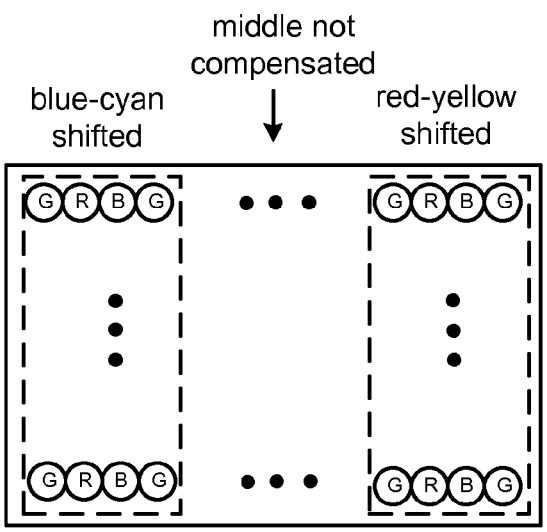
FIG. 4A is a top down view of a backlight similar to FIG. 3A but where the white points of the edge clusters are color shifted to compensate for the edge effects, in accordance with one embodiment of the invention.
Figure 4B:
FIG. 4B illustrates the same backlight of FIG. 4A and shows that there is color uniformity across the entire backlight after the edge clusters are color shifted.

In FIG. 4A, the backlight of FIG. 2 is represented but with only the corner clusters shown for simplicity. In order to achieve color uniformity along the left and right edges of the backlight, the LEDs in those edge clusters (within the dashed outline) are specially selected to compensate for the imbalance in the color emitted by the cluster. To offset the reddish tint along the left edge from the GRBG clusters, the cluster's overall white point is blue-cyan shifted. Similarly, a GBRG cluster along the left edge will have its white point red-yellow shifted. A GRBG cluster along the right edge will have its white point red-yellow shifted, and a GBRG cluster along the right edge will have its white point blue-cyan shifted. As a result, the left and right edges of the backlight emission have the same white point as near the middle of the backlight, even though the white points of the individual edge clusters are different from the target white point of the individual middle clusters. The spatial nonuniformity of the white point of a single cluster not along an edge is offset by the opposite spatial nonuniformity of the white points of the surrounding clusters.

For blue-cyan shifting, the red LED chosen for the left edge GRBG cluster has a flux that is less than the average flux of the red LEDs in clusters near the middle of the backlight, and the blue LED has a flux that is greater than the average flux of the blue LEDs in clusters near the middle of the backlight. The increase in the blue LED flux (blue shifting) is to compensate for the blue center of gravity in the GRBG cluster being to the right of the cluster center, and the reduction in the red LED flux (cyan shifting=white point minus red) is to compensate for the red center of gravity being to the left of the cluster center. The opposite is done for red-yellow shifting of, for example, GRBG clusters along the right edge, where the flux of the red LED is made to be greater than the average flux of red LEDs in the middle clusters (red shifting), and the flux of the blue LED is made to be less than the average flux of the blue LEDs in the middle clusters (yellow shifting=white point minus blue).

As an alternative to shifting the white point of a cluster by selecting LEDs with a particular flux, the shifting may also be done by binning (grouping) the LEDs of a particular color according to their wavelengths and shifting the color point of a cluster by selecting an LED of a particular color from a certain bin. The LEDs of a particular nominal color (e.g., red, blue, or green) typically have a small range of wavelengths, and each LED is tested and binned in accordance with its particular wavelength. There may be any number of bins (e.g., 2-8) for each nominal color depending on the precision of the groupings. For blue shifting of a cluster, the wavelength of at least the red LED in a cluster is chosen to be shorter than the average wavelength for the red LEDs. For red shifting of a cluster, the wavelength of at least the blue LED in a cluster is chosen to be longer than the average wavelength for the blue LEDs.

In another embodiment, the white point shift is accomplished by a combination of flux and wavelength selection.

The four corners of the backlight have the worst color uniformity since there are no offsetting clusters on two sides. These corner clusters may be custom compensated to be even more color shifted than the other edge clusters.

When the LEDs are manufactured, they are tested and binned in accordance with their flux and color. There may be any number of bins for each basic color of LED, such as 5-10 flux bins and 2-8 wavelength bins, depending on the color uniformity tolerance desired. The color shifting of the white points for the edge clusters is achieved by selecting the LEDs from the proper bins. Such selection may be based on empirical testing due to the complexities of color mixing in a particular backlight box and other factors.

This same technique can be applied to any arrangement of clusters in any size backlight to compensate for the white point of a single cluster being unbalanced across the cluster.

FIG. 4B illustrates that color shifting the edge clusters, and optionally further color shifting the corner clusters, results in uniform color across the backlight after the colors have been mixed in the backlight cavity and diffused by a top diffuser.

Figure 5:
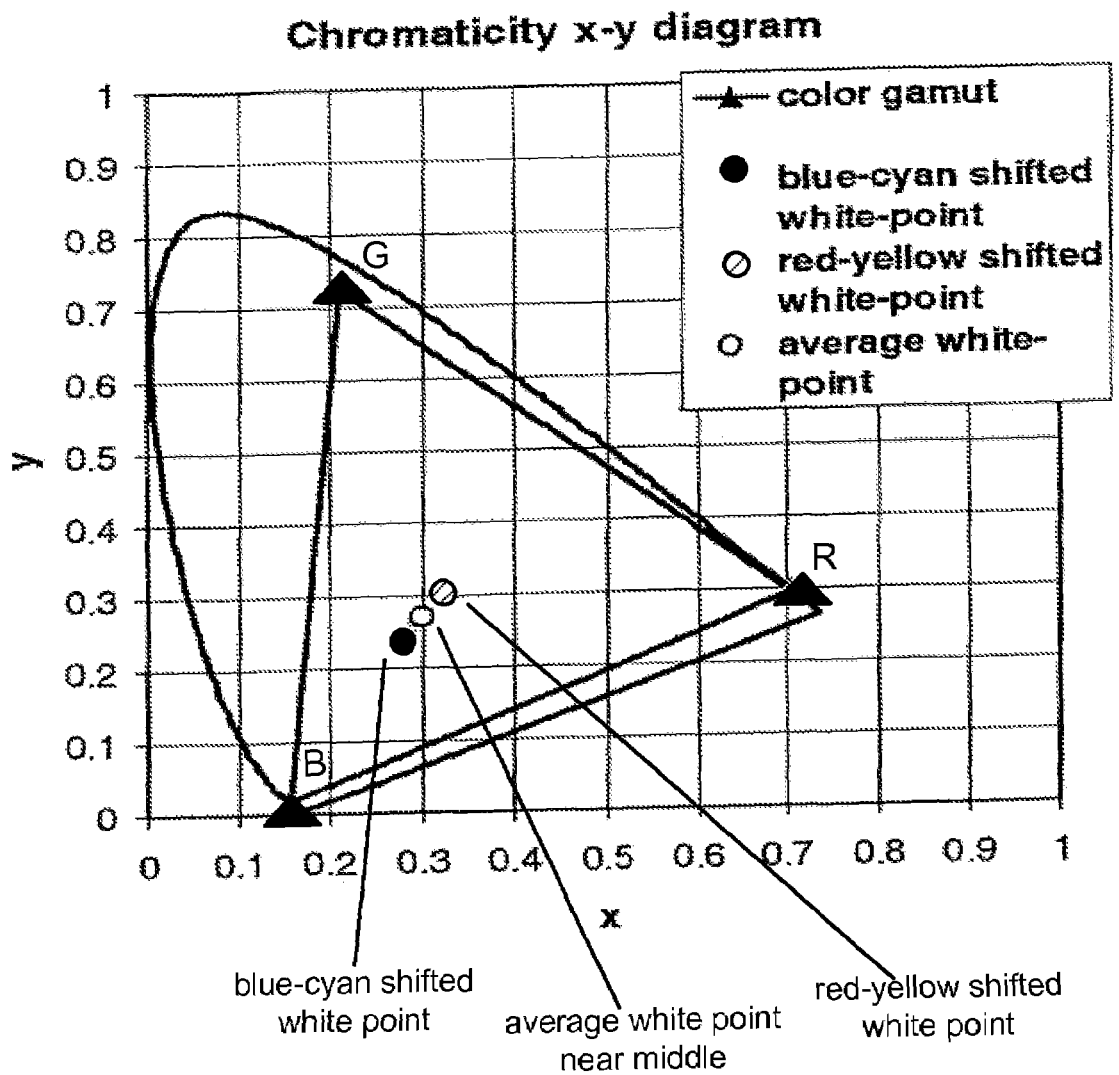
FIG. 5 is a CIE chromaticity diagram showing the color shifting of the edge clusters relative to the target white point of the middle clusters.

FIG. 5 is a CIE chromaticity x-y diagram showing an example of the white point color shifting of the edge clusters. The positions on the chart of nominal green, blue, and red colors are identified at the corners of the triangle by the abbreviations G, B, and R. The triangle represents all the possible colors (the color gamut) that can be made by varying the intensities of the nominal green, red, and blue components. For clusters of green, red, and blue LEDs, such as GRBG, at other than the left and right edges of the backlight, the LEDs are selected from the bins so that all those clusters have approximately the same target white point (the open circle in the diagram), which is equal to the target average white point of the backlight. The target white point is typically selected by the manufacturer of the display (e.g., television) to be a point near the middle of the triangle.

For GRBG or GBRG edge clusters that are to be blue-cyan shifted, the binned LEDs forming those clusters are selected, as described above, to cause the white point to be shifted down and to the left in the diagram, shown as the solid circle in the diagram.

For GRBG or GBRG edge clusters that are to be red-yellow shifted, the binned LEDs forming those clusters are selected, as described above, to cause the white point to be shifted up and to the right in the diagram, shown as the cross-hatched circle in the diagram.

The white points of clusters may also be adjusted by applying different currents to the LEDs in the various clusters instead of selecting LEDs from bins, but that approach is complex and expensive.

The technique of color-shifting edge clusters is applicable to any type of cluster using any number of LEDs but is particularly effective for clusters that are asymmetrical in one or more colors.

Figure 6:
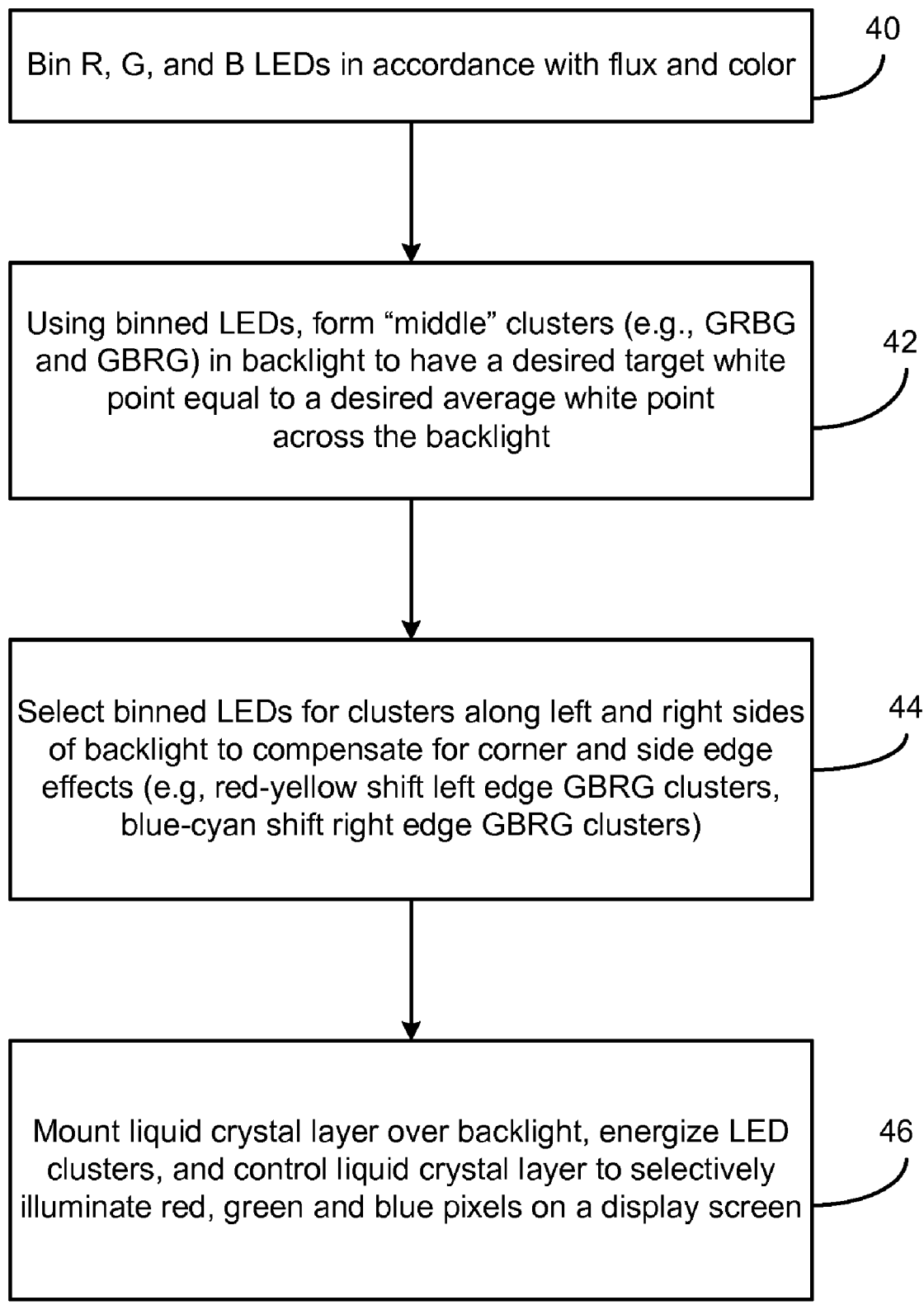
FIG. 6 is a flowchart identify basic steps used to achieve color uniformity across a backlight.

FIG. 6 is a flowchart summarizing the technique described above for improving the color uniformity across a backlight.

In step 40, LEDs are tested using a current source and optical detection equipment to group (bin) LEDs according to their color and flux. For example, a particular bin for red LEDs may contain red LEDs with fluxes within 1% of each other and peak wavelengths within 3 nm of each other.

In step 42, the clusters for other than the edges of the backlight are created from the binned LEDs. Each cluster is formed to have approximately the same target white point, which is equal to the target average white point of the backlight. One way of doing this is to select all the red LEDs from the same bin, select all the green LEDs from the same bin, and select all the blue LEDs from the same bin, where the bins are chosen so that the cluster white point matches the target white point. The selection of the bins may be determined empirically or by computer simulation.

In step 44, the edge clusters are created. LEDs are selected from the bins to color-shift the white point of the edge clusters to offset the edge effects. If the cluster types alternate along an edge, the corner clusters will have edge effects slightly worse than the edge effects experienced by the non-corner clusters along the edge, since a corner cluster only has one vertically adjacent cluster. Therefore, to further improve the color uniformity across the entire backlight, the corner clusters may be slightly more color shifted than the other edge clusters. The appropriate bins may be selected empirically so that substantially the same target white point is perceived across the entire backlight when fully assembled.

In step 46, assuming the backlight is being used in an LCD, a liquid crystal layer is mounted over the backlight, the LED clusters are energized by current sources to create a substantially uniform white point across the backlight, and the liquid crystal layer is controlled to selectively illuminate red, green, and blue pixels on the display screen to display images.

Figure 7:
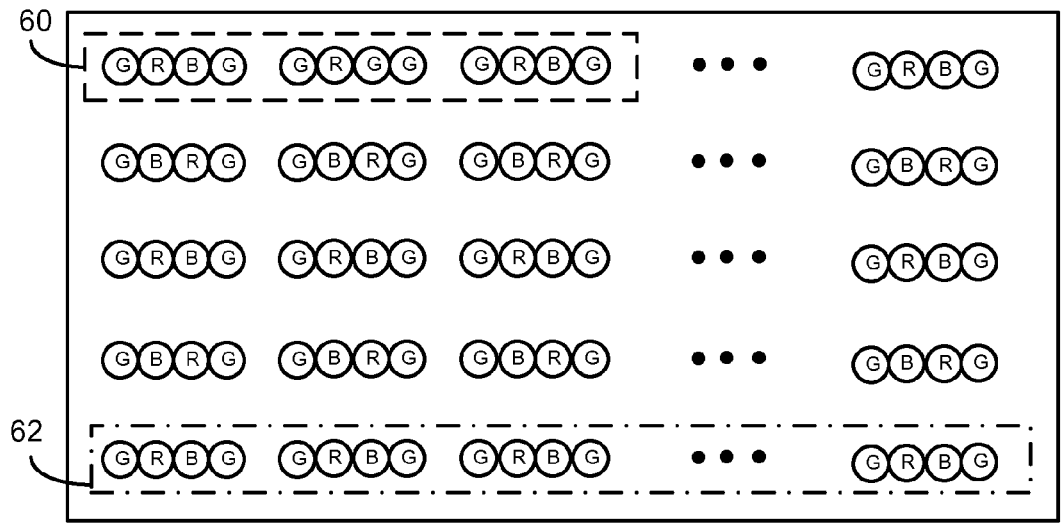
FIG. 7 illustrates the backlight of FIG. 2 showing how the LED array, with color compensated edge clusters, may be formed using identical strips of LEDs. Two examples of strips are shown: a 3-cluster strip and a full row strip.
Figure 8:
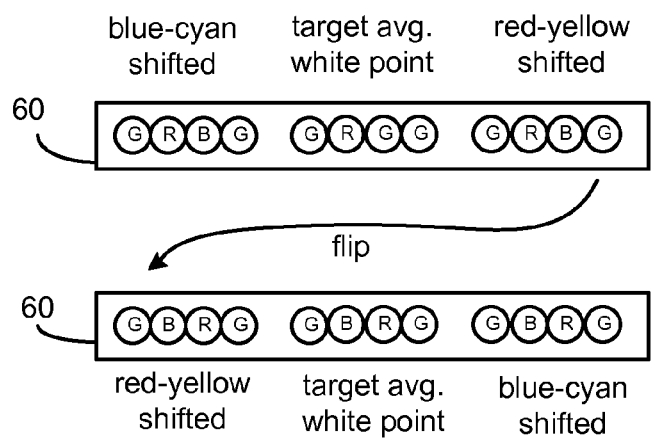
FIG. 8 illustrates how a 3-cluster strip, with color compensated edge clusters, may be used to form the array of FIG. 7.
Figure 9:
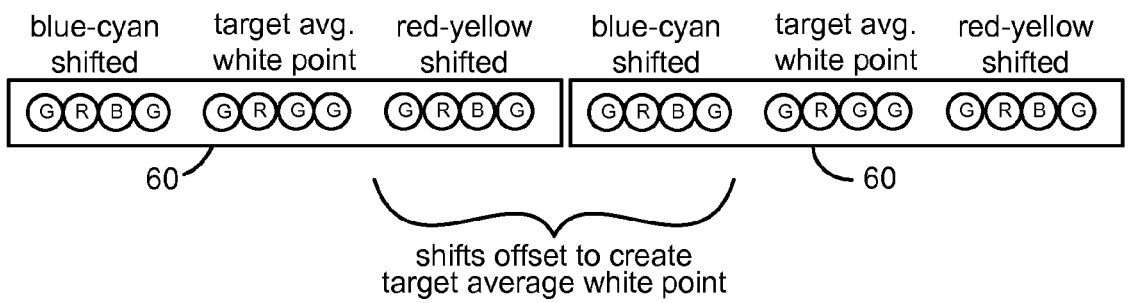
FIG. 9 illustrates how the 3-cluster strips are used to achieve color compensation along the edges without detrimentally affecting the color uniformity near the middle of the backlight.

FIGS. 7-9 illustrate how the invention may be implemented by fabricating identical strips of LEDs and arranging the strips on the base of a backlight box. Although a single backlight may be created using different types of strips of LEDs, it is much simpler for manufacturing and supplying if only one type of strip were used for the entire backlight.

FIG. 7 is identical to FIG. 2 but shows in dashed outline a 3-cluster strip 60 and a single row strip 62. Either strip may be used as the light source to form the entire backlight. Any number of clusters may be in a strip, as long as only one type of strip is used to fabricate the backlight. A strip comprises a printed circuit board with electrical connections for the various LEDs. The LEDs may be interconnected by a metal pattern on the strip to be in series, parallel, or any combination of series and parallel. Electrodes on the strip are connected to a power supply.

The 3-cluster strip 60 is shown at the top of FIG. 8 as having three linear GRBG clusters. At the bottom of FIG. 8, the same strip 60 is rotated 180 degrees to have three linear GBRG clusters. To improve color uniformity, the cluster type alternates from row to row, as shown in FIG. 7.

The two clusters at the end of the strip 60 are color shifted, and the middle cluster is not color shifted. The middle cluster has a white point that equals the average target white point of the backlight. Since the left cluster at the top of FIG. 8 is GRBG, and it will be at the left edge of the backlight, its white point is blue-cyan shifted. Since the right cluster at the top of FIG. 8 is GRBG, and it will be at the right edge of the backlight, its white point is red-yellow shifted. When the same type strip is rotated 180 degrees for the next row, the edge clusters GBRG are properly color shifted. In an embodiment of a 9×7 array of clusters, there will be 21 identical 3-strip clusters.

FIG. 9 illustrates how, when two or more identical strips 60 form a row, the color shifted cluster at the edge of a strip, but not at the edge of the backlight, has its color shifting offset by an adjacent cluster in another strip. In FIG. 9, a red-yellow shifted cluster in the left strip is adjacent to a blue-cyan shifted cluster in the right strip. The average white point of the two clusters equals the target average white point of the backlight. Since the backlight box and top diffuser blends and averages the light from the two adjacent clusters, the color shifting of those two clusters is not perceived.

Forming short identical strips is advantageous since many different sizes of backlights can be formed using the same strips.

If a single strip were used for an entire row, only the edge clusters would be color shifted, and the strip would be rotated 180 degrees from row to row.

Although the clusters along the left and right edges of the backlight have been shifted in the above examples, cluster along the top and bottom edges may also be color shifted if the arrangement of LEDs results in top and bottom edge effects, such as if the LED clusters were arranged vertically.

LEDs of colors other than red, green, and blue may also be used in the backlight to create white light. The backlight 12 in the display of FIG. 1 may be any of the backlights described above, and the display may be a television, a monitor, or any other type of display.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A light emitting device comprising:
an arrangement of light emitting diodes (LEDs) for a backlight, the backlight having at least a first backlight edge and an opposite second backlight edge, the LEDs being grouped in an array of clusters, each cluster being formed of a plurality of colors of LEDs whose combined light has a white point, each cluster having the same number of LEDs, the arrangement comprising:
a first cluster configured to be adjacent the first backlight edge, the first cluster having a first white point;
a plurality of second clusters configured to be not adjacent to either one of the first backlight edge or the second backlight edge, the plurality of second clusters having an average white point different from the first white point; and
at least one LED of a first color in the first cluster having a light output characteristic that is different from a light output characteristic of LEDs of the first color in the plurality of second clusters so that the first white point of the first cluster is color shifted with respect to the average white point of the second clusters to at least partially offset an effect of the first cluster being along an edge of the backlight,
wherein the plurality of colors comprises a first color, a second color, and a third color, the first cluster having a first LED of the first color that is nearer to the first backlight edge than a second LED of the second color, wherein the first LED in the first cluster has a flux less than an average flux of LEDs of the first color in the plurality of second clusters, and wherein the second LED in the first cluster has a flux greater than an average flux of LEDs of the second color in the plurality of second clusters so that the first white point of the first cluster at least partially offsets an effect of the first cluster being along an edge of the backlight.

2. The device of claim 1 further comprising a backlight box, the backlight box comprising:
  a light mixing cavity having side walls and a bottom surface, the side walls comprising the first backlight edge and the second backlight edge; and
  the first cluster and the plurality of second clusters being arranged in the mixing cavity.

3. The device of claim 1 wherein there are only two types of clusters in the array.

4. The device of claim 1 wherein the clusters are arranged in rows and columns.

5. The device of claim 4 wherein the first cluster is located at an end of a row, and the plurality of second clusters are located at other than the end of a row.

6. The device of claim 1 wherein the plurality of colors of LEDs comprises red, blue, and green.

7. The device of claim 1 wherein there are at least a first cluster type and second cluster type in the array, the first cluster type having a first sequence of LED colors, and the second cluster type having a second sequence of LED colors.

8. The device of claim 7 wherein only clusters of the first cluster type form a first set of rows and only clusters of the second cluster type form a second set of rows.

9. The device of claim 8 wherein a row in the second set of rows is interleaved between rows in the first set of rows.

10. The device of claim 9 wherein there is an odd number of rows so that only the first cluster type is at each of the four corners of the array.

11. The device of claim 7 wherein clusters of the first cluster type and clusters of the second cluster type alternate in a single row.

12. The device of claim 7 wherein clusters of the first cluster type and clusters of the second cluster type alternate in a single column such that clusters of the same type are not adjacent one another in a single row or column in the array.

13. The device of claim 1 wherein the clusters are arranged in rows and columns, and the LEDs in a cluster are arranged along a single row, at least one LED in the first cluster along the first backlight edge having a light characteristic that differs from an average light characteristic of LEDs of a corresponding color in the plurality of second clusters to color shift the first white point of the first cluster relative to the average white point of the second plurality of clusters to at least partially offset an effect of the first cluster being along an edge of the backlight.

14. The device of claim 1 wherein the plurality of colors comprises a first color, a second color, and a third color, the first cluster having a first LED of the first color that is nearer to the first backlight edge than a second LED of the second color, the device further comprising:
  a third cluster configured to be adjacent the second backlight edge, the third cluster having a third LED of the second color that is nearer to the second backlight edge than a fourth LED of the first color, the third cluster having a third white point, the plurality of second clusters having an average white point different from the third white point; and
  the third LED in the third cluster being selected to have a light characteristic that differs from an average light characteristic of LEDs of the second color in the plurality of second clusters, the fourth LED in the third cluster being selected to have a light characteristic that differs from an average light characteristic of LEDs of the first color in the plurality of second clusters to at least partially offset an effect of the third cluster being along an edge of the backlight.

15. The device of claim 14 wherein the third white point is different from the first white point.

16. The device of claim 14 wherein the first cluster, the plurality of second clusters, and the third cluster are in a same row in the array of clusters.

17. The device of claim 1 wherein the first cluster and the plurality of second clusters are mounted on at least one strip prior to being mounted in a backlight, wherein a plurality of identical strips are arranged to form the backlight.

18. The device of claim 17 wherein each strip has a two end clusters, each end cluster having a color shifted white point that differs from an average white point of the backlight.

19. The device of claim 18 wherein the end clusters on a single strip are color shifted in opposite color directions.

20. The device of claim 18 wherein two strips are placed end to end to make a single row of clusters in the backlight, adjacent color shifted clusters having their white points substantially offset by one another such that an average white point of the adjacent color shifted clusters is approximately an average white point of the backlight.

21. The device of claim 1 wherein a sequence of LEDs in a cluster is asymmetric.

22. The device of claim 1 wherein the first cluster and the plurality of second clusters are selected from the group consisting of GRBG, GBRG, RBGR, RGBR, BGRB, and BRGB.

23. The device of claim 1 further comprising a light mixing cavity, in which the array of clusters is mounted, and a liquid crystal layer overlying the cavity for selectively controlling red, green, and blue pixels in a display screen, the device being a liquid crystal display (LCD).

24. The device of claim 23 wherein the LCD is a television.

25. A light emitting device comprising:
  an arrangement of light emitting diodes (LEDs) for a backlight, the backlight having at least a first backlight edge and an opposite second backlight edge, the LEDs being grouped in an array of clusters, each cluster being formed of a plurality of colors of LEDs whose combined light has a white point, each cluster having the same number of LEDs, the arrangement comprising:
  a first cluster configured to be adjacent the first backlight edge, the first cluster having a first white point;
  a plurality of second clusters configured to be not adjacent to either one of the first backlight edge or the second backlight edge, the plurality of second clusters having an average white point different from the first white point; and
  at least one LED of a first color in the first cluster having a light output characteristic that is different from a light output characteristic of LEDs of the first color in the plurality of second clusters so that the first white point of the first cluster is color shifted with respect to the average white point of the second clusters to at least partially offset an effect of the first cluster being along an edge of the backlight,
  wherein the plurality of colors comprises a first color, a second color, and a third color, the first cluster having a first LED of the first color that is nearer to the first backlight edge than a second LED of the second color, wherein the first LED in the first cluster has a wavelength that is less than an average wavelength of LEDs of the first color in the plurality of second clusters so that the first white point of the first cluster at least partially offsets an effect of the first cluster being along an edge of the backlight.

26. A light emitting device comprising:

an arrangement of light emitting diodes (LEDs) for a backlight, the backlight having at least a first backlight edge and an opposite second backlight edge, the LEDs being grouped in an array of clusters, each cluster being formed of a plurality of colors of LEDs whose combined light has a white point, each cluster having the same number of LEDs, the arrangement comprising:

a first cluster configured to be adjacent the first backlight edge, the first cluster having a first white point;

a plurality of second clusters configured to be not adjacent to either one of the first backlight edge or the second backlight edge, the plurality of second clusters having an average white point different from the first white point; and at least one LED of a first color in the first cluster having a light output characteristic that is different from a light output characteristic of LEDs of the first color in the plurality of second clusters so that the first white point of the first cluster is color shifted with respect to the average white point of the second clusters to at least partially offset an effect of the first cluster being along an edge of the backlight, wherein the plurality of colors comprises a first color, a second color, and a third color, the first cluster having a first LED of the first color that is nearer to the first backlight edge than a second LED of the second color, wherein the first LED in the first cluster has a wavelength that is greater than an average wavelength of LEDs of the first color in the plurality of second clusters so that the first white point of the first cluster at least partially offsets an effect of the first cluster being along an edge of the backlight.

27. A method of backlighting a display comprising:

providing an arrangement of light emitting diodes (LEDs) in a mixing cavity of a backlight, the backlight having at least a first backlight edge and an opposite second backlight edge, the LEDs being grouped in an array of clusters, each cluster being formed of a plurality of colors of LEDs whose combined light has a white point, the plurality of colors comprising a first color, a second color, and a third color, each cluster having the same number of LEDs;

energizing a first cluster adjacent the first backlight edge, so that the first cluster has a first white point;

energizing a plurality of second clusters that are not adjacent to either one of the first backlight edge or the second backlight edge, so that the plurality of second clusters has an average white point different from the first white point, the first white point being color shifted relative to the average white point to at least partially offset an effect of the first cluster being along an edge of the backlight;

mixing the light emitted from all the clusters in the mixing cavity;

providing at least one liquid crystal layer over the mixing cavity; and controlling the at least one liquid crystal layer to control the brightness of red, green, and blue display pixels, wherein the first cluster having a first LED of the first color that is nearer to the first backlight edge than a second LED of the second color, wherein the first LED in the first cluster has a flux less than an average flux of LEDs of the first color in the plurality of second clusters, and wherein the second LED in the first cluster has a flux greater than an average flux of LEDs of the second color in the plurality of second clusters so that the first white point of the first cluster at least partially offsets an effect of the first cluster being along an edge of the backlight.

28. The method of claim 27 further comprising:

energizing a third cluster adjacent the second backlight edge, the third cluster having a third white point, the third white point being color shifted relative to the average white point to at least partially offset an effect of the third cluster being along an edge of the backlight.

29. The method of claim 28 wherein the third white point is shifted in a first color direction, relative to the average white point, and the first white point is shifted in an opposite color direction.

30. The method of claim 27 wherein the wherein the first cluster and the plurality of second clusters are selected from the group consisting of GRBG, GBRG, RBGR, RGBR, BGRB, and BRGB.

* * * * *